Patented Jan. 15, 1935

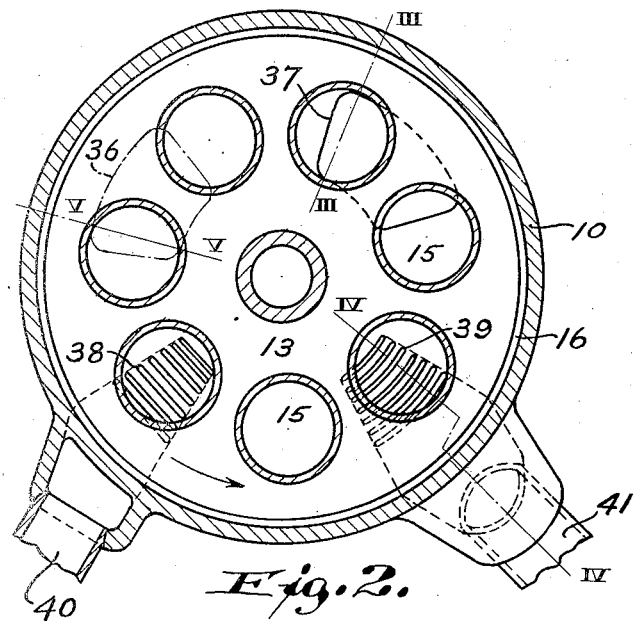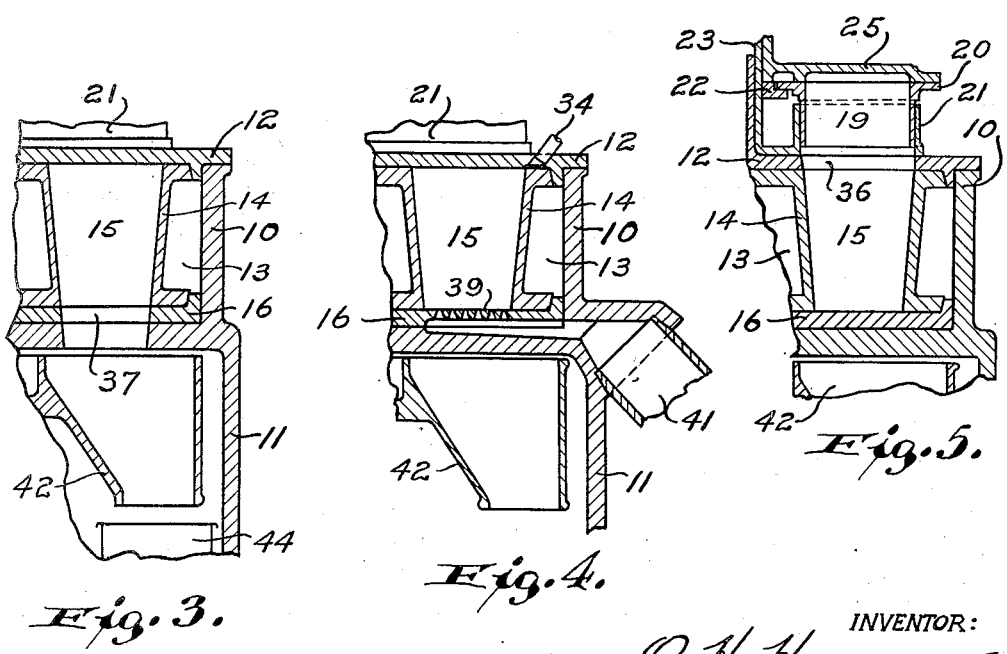

1,987,824

UNITED STATES PATENT OFFICE 1,987,824

PROCESS OF STERILIZING FOOD

Oswald H. Hansen, Cedarburg, Wis.

Application May 2, 1931, Serial No. 534,549

10 Claims. (Cl. 99—8)

The present invention relates in general to improvements in the art of heat treating food products, and relates more specifically to an improved process of and apparatus for sterilizing substances such as food products, in order to permanently preserve the same.

Generally defined, an object of the invention is to provide a simple and efficient process of and apparatus for quickly and effectively sterilizing various classes of food products in order to prevent spoilage thereof.

Various methods of heat treating food products in order to sterilize the same by destroying bacteria and other destructive micro-organisms therein, have heretofore been proposed, but none of these prior processes have proven entirely satisfactory in connection with the treatment and final packing of certain classes of such products. In order to effect successful commercial sterilization of certain foods, it is necessary to rapidly heat treat the same in an effectve manner, and it is also desirable to be able to perform the heat treating operation under sterile conditions either before or after batches of the commodity have been placed in the final containers.

As disclosed in Patent No. 1,563,971, it has heretofore been proposed to sterilize food after batches thereof have been placed in the cans, by first producing a partial vacuum in each can, and by subsequently injecting steam into the can and sealing the same, it being contemplated that the vacuous condition should assist the steam under pressure in permeating through and agitating the contents of the container. This prior process is impractical for the treatment of all foods for several reasons. It is impossible in treating certain foods to inject sufficient steam within the limited space produced by the initial evacuation, to insure rapid and complete sterilization of the confined product. It is also impossible to subject certain materials to steam at the temperature required for sterilization, without danger of scorching and deteriorating the product.

As disclosed in Patent No. 1,756,550, it has also been proposed to sterilize food products by admitting to the voids of pre-heated solids, a liquid having sufficiently high temperature to completely sterilize the mixture. While this prior process is effectively applicable to certain classes of foods, it is not as effectively applicable for the treatment of other food products. If the heating liquid is applied to the granules at sufficiently high temperature to insure complete sterilization, while the solid or granular material is subjected to low pressure, it may be necessary to have the heating liquid sufficiently hot so that the moisture within the granules will be converted into steam, thus causing the granules to burst from internal pressure and degrade the product. The use of liquid as a heat transferring medium, however, eliminates danger of scorching the commodity.

As disclosed in Patent No. 1,857,450, granted May 10, 1932, it has been proposed to modify the sterilization process set forth in Patent No. 1,756,550, by admitting the heating liquid to the voids of the granular material or solids, while the latter are mantained under temperature and pressure sufficiently high to prevent bursting thereof due to internal pressure. This improved treatment may be effected either before or after batches of the commodity have been placed in containers, such as cans or jars, and it insures rapid, effective and uniform sterilization of the product without danger of injuring the same.

The present invention contemplates certain improvements in the latter of the above-described prior processes, whereby a relatively dry vacuum pack of the final product may be effectively obtained, that is, whereby the solid material under vacuum and in substantially dry and thoroughly sterilized conditions, constitutes the final product. Such relatively dry vacuum packing is advantageous with certain commodities, since it maintains certain of the vitamins in activated condition, and also because the substance can be maintained more nearly in its natural condition as to appearance and taste.

The improved process of sterilizing, is especially and advantageously applicable to the treatment of commodities such as green peas, string beans, whole grain corn, etc., and besides saving labor and eliminating can losses, the process enables embodiment in a single machine unit, of the can filler, briner, drainer, blancher, washer, exhauster, cooker, cooler, closing machine, and conveying equipment, thereby reducing the canning plant to its simplest form.

These and other objects and advantages will appear from the following detailed description, and some of the novel features shown, but not specifically claimed herein, form the subject of said Patent No. 1,857,450, of which the present application is a continuation in part.

A clear conception of the steps constituting the improved process of sterilizing, and of one embodiment of apparatus for effecting commercial exploitation thereof, may be had by referring to the drawings accompanying and forming a part of this specification in which like reference characters designate the same or similar parts in the several views.

Fig. 2 is a transverse section through the device of Fig. 1, taken along the line II—II of Fig. 1;

Fig. 3 is a fragmentary vertical section through the device, taken along the line III—III of Fig. 2;

Fig. 4 is a fragmentary vertical section through the device, taken along the line IV—IV of Fig. 2; and Fig. 5 is a fragmentary vertical section through the device, taken along the line V—V of Fig. 2.

Figure 1:
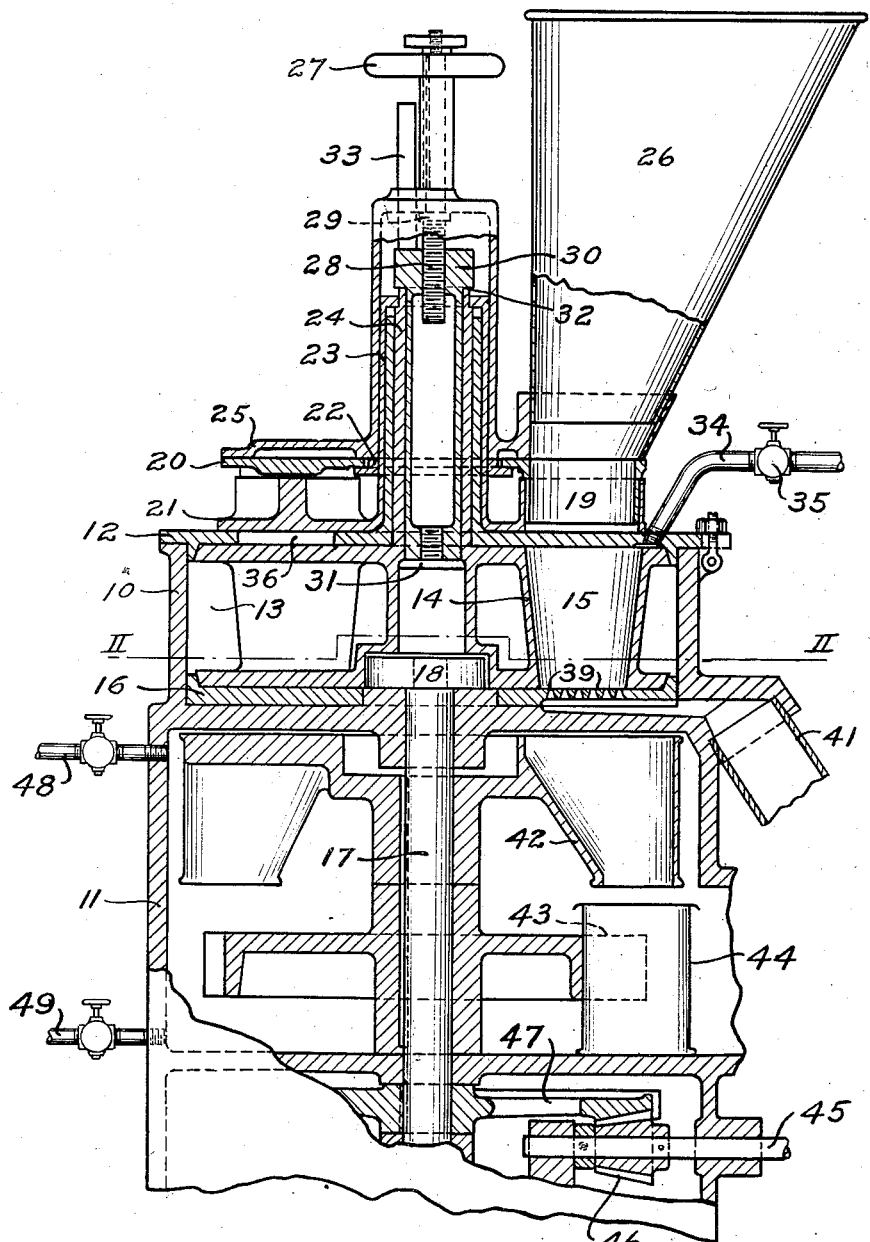
Fig. 1 is a central vertical section through a combined granular material measuring, feeding and sterilizing device for delivering premeasured batches of granular material in heated condition, to successive cans of a series while the cans and the material are maintained under relatively high temperature and pressure.

In accordance with the present invention, solid or granular material is sterilized either in bulk or in batches, by immersing the same under relatively high temperature and pressure in a heated liquid containing sufficient heat units to effectively sterilize the solids. The treating liquid thus utilized, is preferably heated to a temperature sufficiently high to completely sterilize the solids or granular material and above the normal boiling point of the liquid, and the immersion is effected under pressure sufficient to prevent boiling of the liquid. After sufficient heat has been applied to and absorbed by the solid material, the liquid may be removed and the heated solids subsequently packed while maintained under relatively high temperature and pressure, in receptacles such as tin cans, with the aid of cap applying and closing machinery of well-known construction, associated with the measuring and sterilizing device in the manner indicated in said Patent No. 1,857,450. The hermetically sealed relatively dry product is then permitted to cool, and in doing so produces a vacuum in the can or other container.

While the process will be described herein as specifically applied to the treatment of successive batches of granular material, the improvement is obviously more generally applicable to the treatment of commodities in bulk. In all cases, the excess pressure and temperature on the product and the containers, should be gradually relieved so as to prevent destruction of the cans and of the solid food particles. The removal of heating liquid should, moreover, be substantially complete, so that the final solid product is in relatively dry condition and under relatively high vacuum.

Referring to the drawings, the combined measuring, feeding and sterilizing device shown therein, is adapted for use in conjunction with a capping and conveying mechanism, such as shown in said Patent No. 1,857,450, granted May 10, 1932, and comprises in general a sealed housing 10 formed integral with a lower casing 11, and having a removable top closure 12 coacting therewith to form a sealed pressure chamber 13. A rotor 14 having an annular series of pockets 15 formed therein, is revoluble within the chamber 13 upon a lower bearing plate 16, the top of the rotor snugly engaging the lower portion of the closure 12. The rotor 14 is freely vertically removable from the chamber 13 upon the removal of the top closure 12, and is rotatable directly by means of a main drive shaft 17 having a driving head 18 at its upper end coacting with a socket formed in the lower central portion of the rotor 14.

A series of granular material measuring pockets 19 of variable volume, are formed in relatively adjustable upper and lower members 20, 21, the lower of which rests directly upon and is rotatable relatively to the fixed closure 12, these measuring pockets 19 always being disposed in vertical alinement with the corresponding mixing and sterilizing pockets 15 located therebelow. The upper member 20 of the set which forms the pockets 19, is rotatably supported upon a non-rotary adjusting ring 22, and the lower member 21 has an integral sleeve 23 which is detachably but drivingly connected to the upper end of a sleeve 24 formed integral with the rotor 14. A non-rotatable but vertically adjustable top plate 25 to which the adjusting ring 22 is attached, coacts with the upper member 20 and provides a support for the granular material supply hopper 26. The top plate 25, ring 22, and upper member 20, are simultaneously vertically adjustable relative to the lower member 21, by means of a hand wheel 27 and screw 28.

The hand wheel 27 has a hub resting directly upon the upper extension of the top plate 25, and the screw 28 which is keyed to the hand wheel 27, has a collar 29 reacting against a lower surface of the plate extension and also has a threaded lower end coacting with a central non-rotary element 30. The element 30 is fixed against vertical displacement relative to the rotor 14, by means of a screw plug 31 at its lower end and a shoulder 32 at the upper end thereof, coacting with the lower and upper ends respectively of the sleeve 24 formed integral with the rotor 14. A pin 33 rigidly attached to the element 30, penetrates a hole in the upper extension of the plate 25, thus preventing relative rotation of the element 30 and plate 25, while permitting free vertical movement of the plate 25 and of the elements carried thereby for the purpose of varying the volumes of the pockets 19. The plate 25 and the element 30, may be anchored against rotation in any suitable manner in order to prevent lateral displacement of the hopper 26.

The chamber 13 and pockets 15 may be supplied with steam under any desired temperature and pressure, by means of one or more steam inlet pipes 34 having a control valve 35 therein, which communicates with the chamber 13 remote from the opening 36 in the closure 12 through which the measured batches of granular material are adapted to be delivered by gravity into the corresponding pockets 15 located therebeneath. The bearing plate 16 is provided with a discharge opening 37 adapted to deliver the successive heat treated batches of dry granular material from the pockets 15 to the chamber within the lower casing 11, and also has a succession of openings or slots 38, 39 therein as shown in Figs. 1, 2 and 4. The slots 38 communicate directly with a heated liquid supply pipe 40 for delivering the sterilizing liquid upwardly through the batches of granular material in the successive pockets 15, and the slots 39 likewise communicate directly with a drain pipe 41 for automatically removing the heating liquid from the granules prior to delivery of the latter through the discharge opening 37.

Located within the lower casing 11, is a series of funnels 42, these funnels being revoluble with the main shaft 17 and being disposed directly beneath and in vertical alinement with the pockets 15. A series of can hooks 43 is also secured to the drive shaft 17 below the funnels 42, these hooks being adapted to position the successive cans 44 beneath and in vertical alinement with the funnels 42. The main vertical drive shaft 17 is adapted to be driven from a power shaft 45 through a pinion 46 and gear 47 located beneath the floor of the casing 11, and steam or other heating agency, may be delivered to and from the interior of the casing 11 through valve controlled pipes 48, 49, as shown in Fig. 1. The mechanism for subsequently transporting the cans to the capping or closing mechanism and cooler, is fully set forth in the said Patent No. 1,857,450, and need not be specifically described herein.

During normal operation of the machine in order to exploit the improved process, the granular material which is to be heat treated, is delivered in bulk to the supply hopper 26 and steam at the proper temperature and pressure is supplied to the interior of the casing 11 and housing 10, through the pipes 48, 34, thereby maintaining the chamber 13 and the interior of the casing 11 under high pressure and temperature at all times. The main shaft 17 is being rotated to simultaneously drive the can hooks 43, funnels 42, rotor 14 and members 20, 21, thus transporting the successive cans 44 and funnels 42 beneath the discharge opening 37 and also causing the successive measuring pockets 19 to receive batches of granules from the stationary hopper 26. As the pockets 19 are filled, they are advanced between the top plate 25 and the closure 12, and are automatically sealed from the atmosphere, after which the successive measured batches are deposited into the pockets 15 located therebelow, through the opening 36 in the closure 12. In the pockets 15, the granular material is subjected to high pressure and temperature and the batches are eventually carried over the slots 38 when heating liquid under high pressure is delivered upwardly through each charge from the pipe 40. The pockets 15 substantially filled with the mixture of heated liquid and granules, are then carried forward until the slots 39 are reached, whereupon the heating liquid will have transferred sufficient heat units to the granules to insure complete sterilization thereof, and will be delivered from the pockets 15 through the drain pipe 41, leaving the granular material highly heated and in substantially dry condition. The batches of heated solids are subsequently discharged in succession through the opening 37 to the successive cans 44 which are likewise located in a zone of high pressure and temperature, and the cans 44 are thereafter hermetically sealed and conveyed into cooling zones of gradually reduced temperature and pressure until the confined charges have cooled. During such cooling, the pressure as well as the temperatures within the cans, continue to decrease, until a high vacuum is established in each of the hermetically sealed cans 44.

By utilizing liquid heated to a temperature sufficient to sterilize the food product and above its normal boiling point and subjected to pressure sufficient to prevent boiling, as a heating medium, the temperature of the liquid may be sufficiently high to insure rapid and complete sterilization of the solids, without danger of scorching or burning. The heating medium not only sterilizes the granules, but also injects sufficient heat units into the granules to insure complete sterilization of the entire confining surface of each can 44 and closure therefor. By maintaining the heated granular material under high pressure from the time the heating liquid is removed until after sealing of the cans, danger of degrading the material by bursting of the granules, is entirely eliminated, and the heat of the hermetically sealed granules will be gradually disbursed through the walls of the can until the desired dry vacuum pack has been attained.

The degree of pressure and temperature required may be regulated to suit the particular commodity to be treated, by means of valves in the steam pipes 34, 48, and any desired number of these pipes may be provided. If necessary, the pockets 15 may also be provided with vents for permitting ingress of the heating liquid, although it is not necessary to have the pockets 15 filled with mixture, it being desirable to merely immerse the entire batches of granular material which never completely fill the pockets 15. The entire machine when once properly adjusted, operates entirely automatically, and the volumes of the batches of granular material may be quickly varied either while the machine is operating or when it is stopped, thereby permitting the packing of various sized cans 44. The machine may moreover be readily assembled and dismantled for inspection and cleaning.

It should be understood that it is not desired to limit the invention to the exact details of construction of the machine or to the precise steps of the method, herein shown and described, for various modifications within the scope of the claims, may occur to persons skilled in the art.

It is claimed and desired to secure by Letters Patent:

1. The process of sterilizing, which comprises, mixing with solids a liquid containing sufficient heat units to completely sterilize the solids, removing the liquid from the solids after sufficient heat units have been transferred to effect complete sterilization of the solids, and allowing the relatively dry solids to cool while gradually relieving the pressure thereon.

2. The process of sterilizing, which comprises, mixing with granular material a liquid containing sufficient heat units to completely sterilize the granules, removing the liquid after equalization of the temperature of the mixture and while the same is under pressure, and finally hermetically sealing the granular material and allowing the same to cool.

3. The process of sterilizing, which comprises, mixing with granular material a liquid containing sufficient heat units to sterilize the granules while the latter are subjected to high external pressure, removing the liquid from the granular material after sufficient heat units have been transferred to completely sterilize the granules while maintaining relatively high external pressure on the latter, and hermetically sealing the heated granules and allowing the same to cool.

4. The process of sterilizing, which comprises, immersing successive batches of granular material in highly heated liquid under pressure and containing sufficient heat units to completely sterilize the granules, removing the granular material from the liquid while in heated condition and still under pressure, hermetically sealing the successive batches of heated granules, and allowing the sealed batches to cool.

5. The process of sterilizing, which comprises, filling the voids of successive batches of granular material with hot liquid containing sufficient heat units to completely sterilize the granules, removing the liquid from the said voids while the granules are heated and subjected to relatively high external pressure, and hermetically sealing the heated batches while subjected to said high pressure and thereafter allowing the same to cool.

6. The process of sterilizing, which comprises, mixing with a food product while under high pressure a liquid containing sufficient heat units to completely sterilize the product, removing the heating liquid from the product after sufficient heat units have been transferred to effect complete sterilization of the product, and allowing the food product to cool while gradually reducing the temperature thereof.

7. The process of sterilizing, which comprises, rendering a food product sterile by causing the same to contact with a liquid heated to a temperature sufficient to sterilize the product and above its normal boiling point and subjected to pressure sufficient to prevent boiling, maintaining the product under pressure while removing heating liquid therefrom, and sealing the heat treated product in a container while subjected to high temperature and pressure.

8. The process of sterilizing, which comprises, rendering a food product sterile by causing the same to contact with liquid having a temperature sufficiently high to sterilize the product while the product and heating liquid are subjected to pressure sufficient to prevent boiling of the latter, removing heating liquid from the product while maintaining the same under pressure above atmospheric, and sealing the heat treated product in containers.

9. The process of sterilizing, which comprises, rendering a food product sterile by mixing it with a liquid and subjecting the product to a temperature sufficiently high to sterilize the same while the mixture is subjected to pressure sufficient to prevent boiling of the liquid, removing the liquid from the mixture while maintaining the product under pressure, and allowing the sterile product to cool while relieving the pressure thereon.

10. The process of sterilizing, which comprises, rendering granular material sterile by mixing it with a liquid and subjecting the material to a temperature sufficiently high to sterilize the same while the mixture is subjected to pressure sufficient to prevent boiling of the liquid, removing the liquid from the granular material while maintaining the material under pressure above atmospheric, and allowing the relatively dry granular material to cool while relieving the pressure thereon.

OSWALD H. HANSEN